Oct. 28, 1952  E. T. HODGE  2,615,572
SPIRAL SEPARATOR
Filed Aug. 26, 1946  7 Sheets-Sheet 1
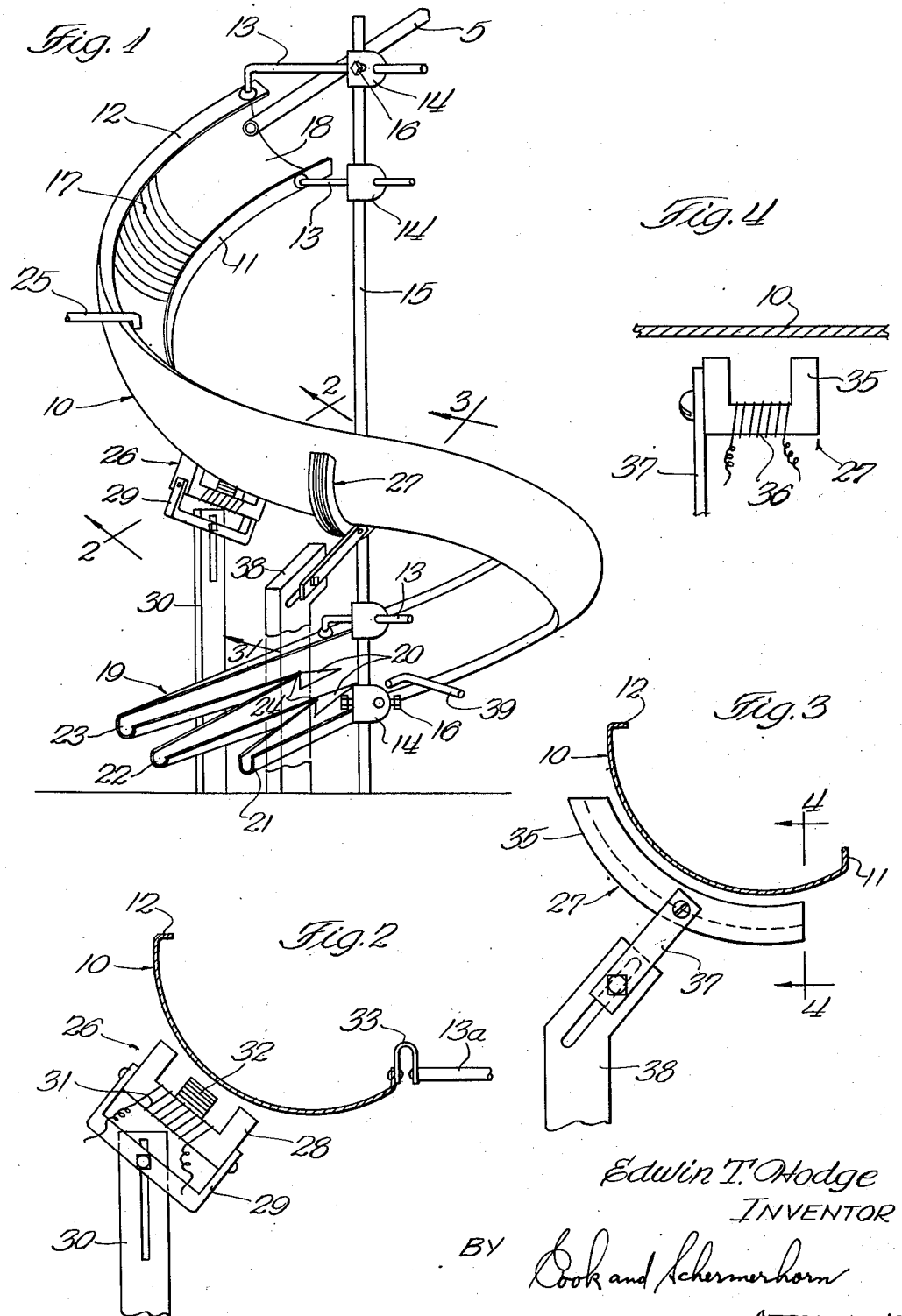
Edwin T. Hodge
INVENTOR
BY Cook and Schermerhorn
ATTORNEYS Oct. 28, 1952     E. T. HODGE     2,615,572
SPIRAL SEPARATOR Filed Aug. 26, 1946     7 Sheets-Sheet 2

Edwin T. Hodge
INVENTOR
BY
Cook and Schermerhorn
ATTORNEYS

Oct. 28, 1952  E. T. HODGE  2,615,572
SPIRAL SEPARATOR
Filed Aug. 26, 1946  7 Sheets-Sheet 3
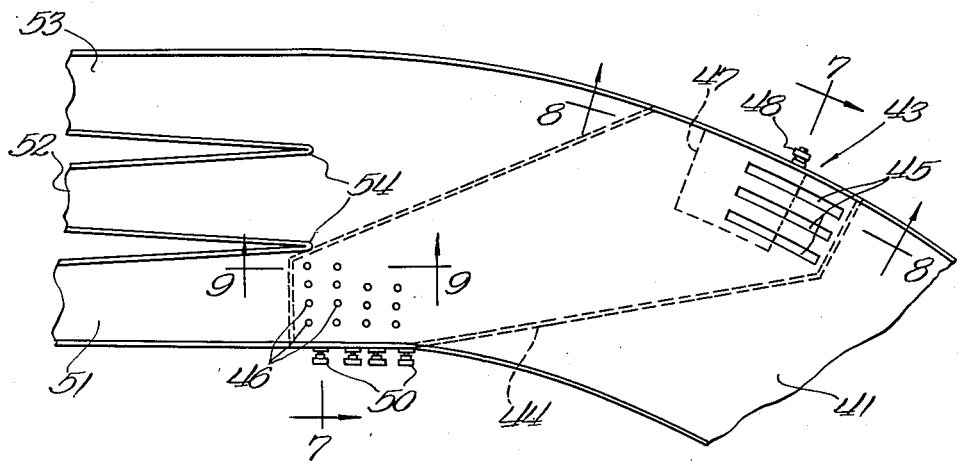
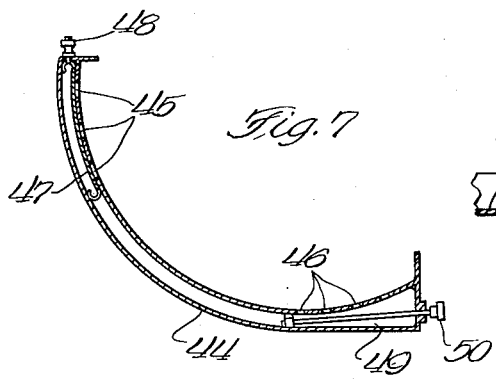
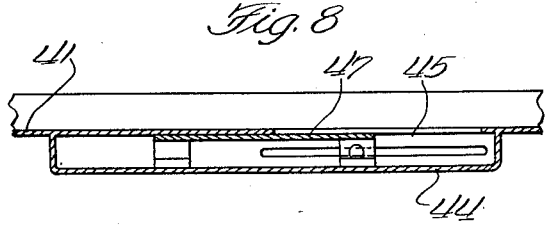
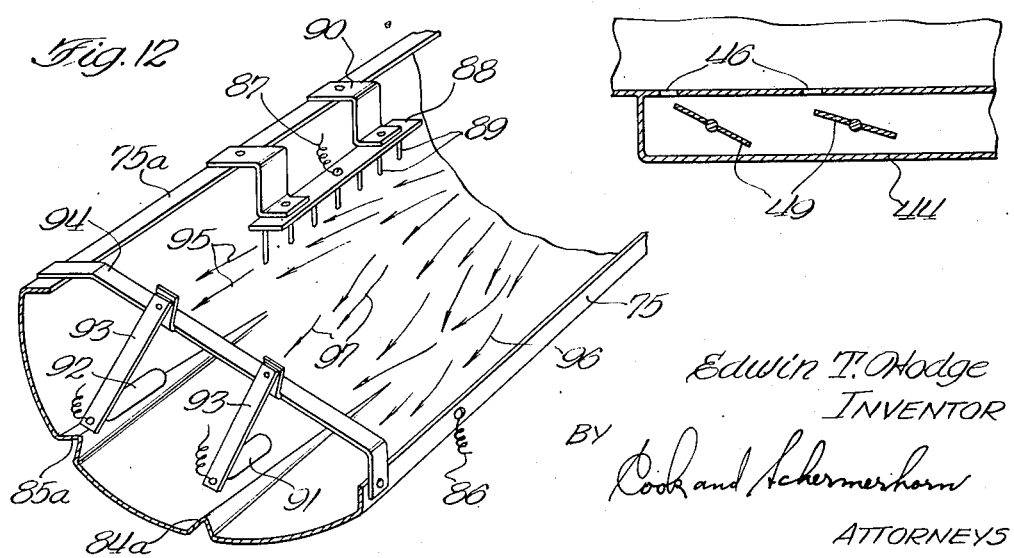
Edwin T. Hodge
INVENTOR
BY Cook and Schermerhorn
ATTORNEYS Oct. 28, 1952  E. T. HODGE  2,615,572
SPIRAL SEPARATOR
Filed Aug. 26, 1946  7 Sheets-Sheet 4
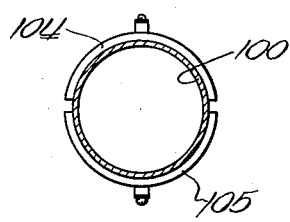
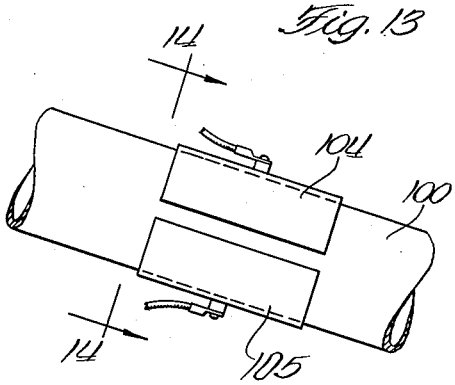
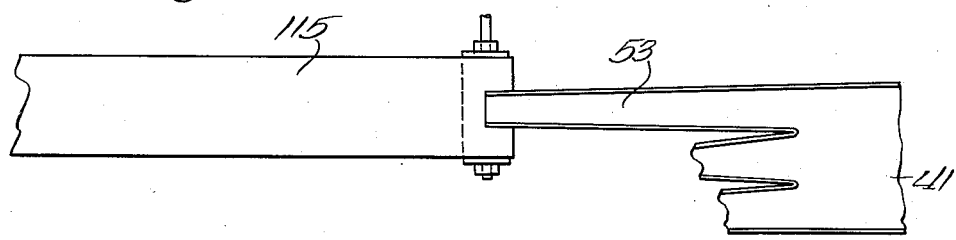
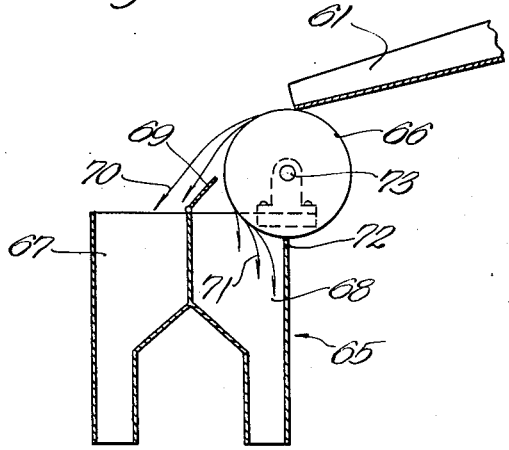
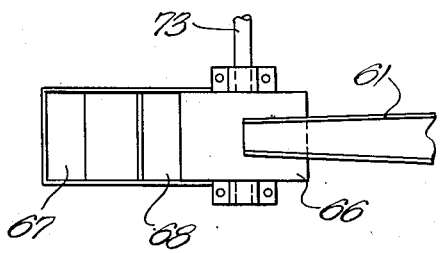
Edwin T. Hodge
INVENTOR
BY Cook and Schermerhorn
ATTORNEYS

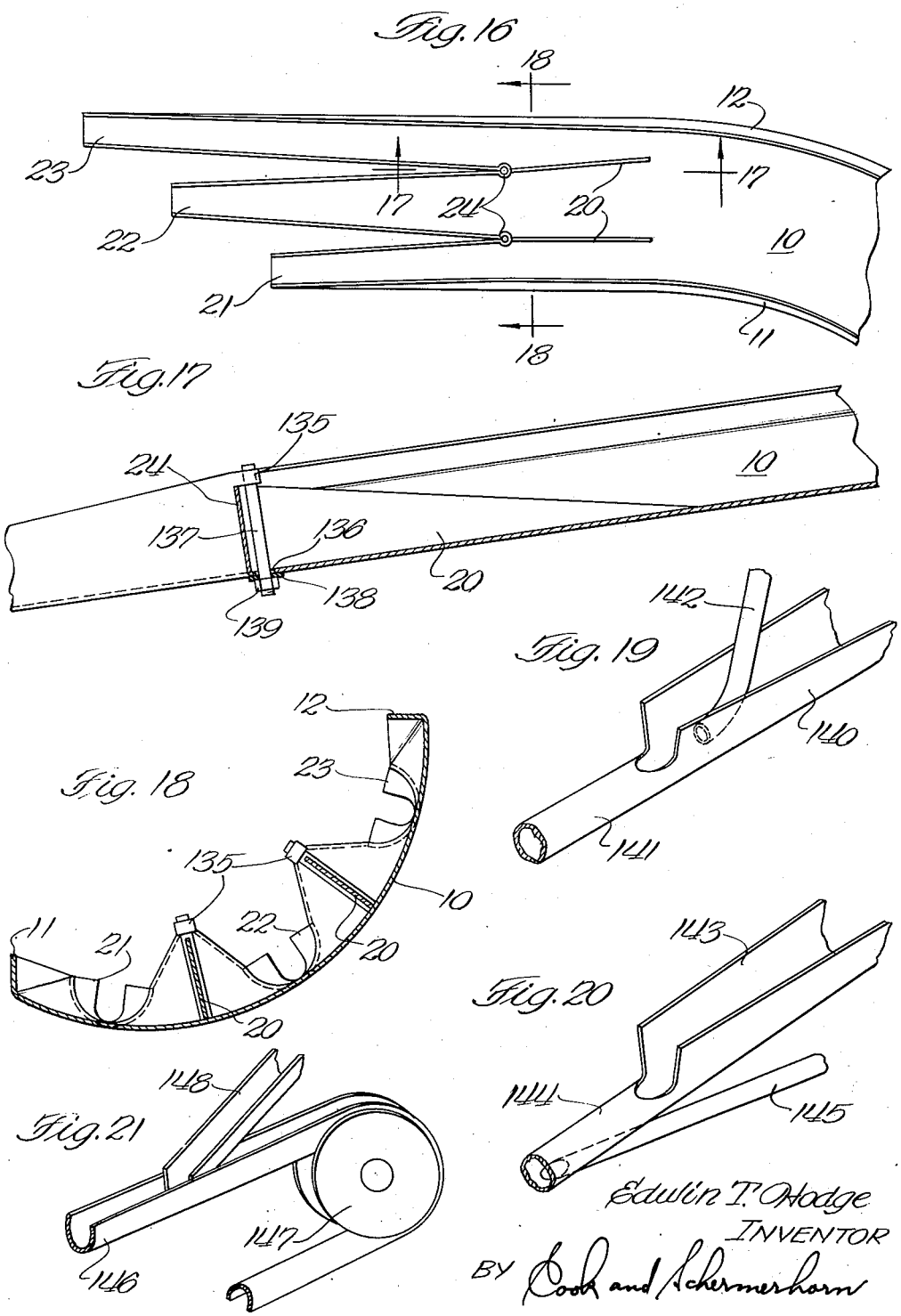

Oct. 28, 1952     E. T. HODGE     2,615,572
SPIRAL SEPARATOR
Filed Aug. 26, 1946     7 Sheets-Sheet 6
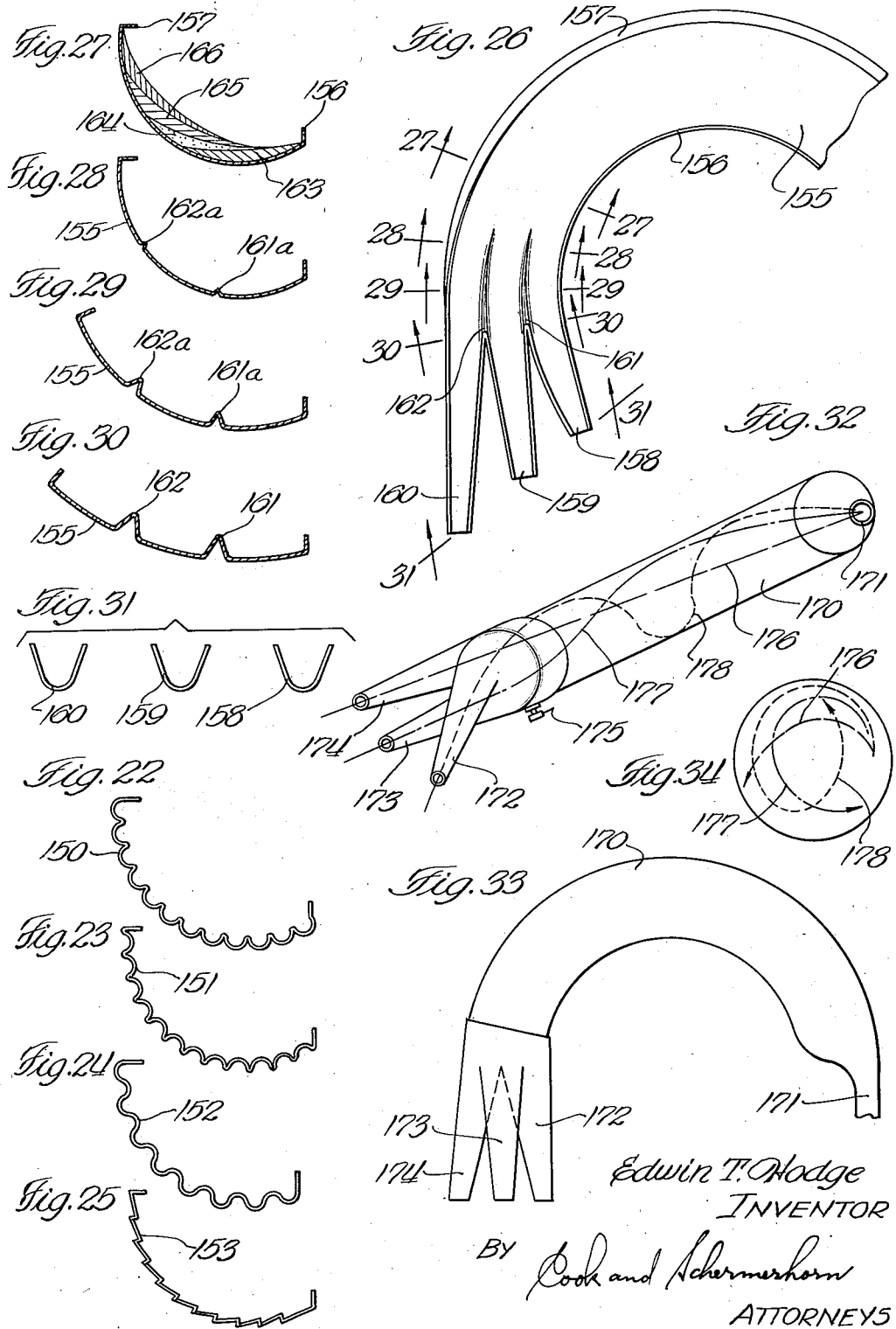
Edwin T. Hodge
INVENTOR
BY Cook and Schermerhorn
ATTORNEYS Oct. 28, 1952 E. T. HODGE 2,615,572
SPIRAL SEPARATOR
Filed Aug. 26, 1946 7 Sheets-Sheet 7
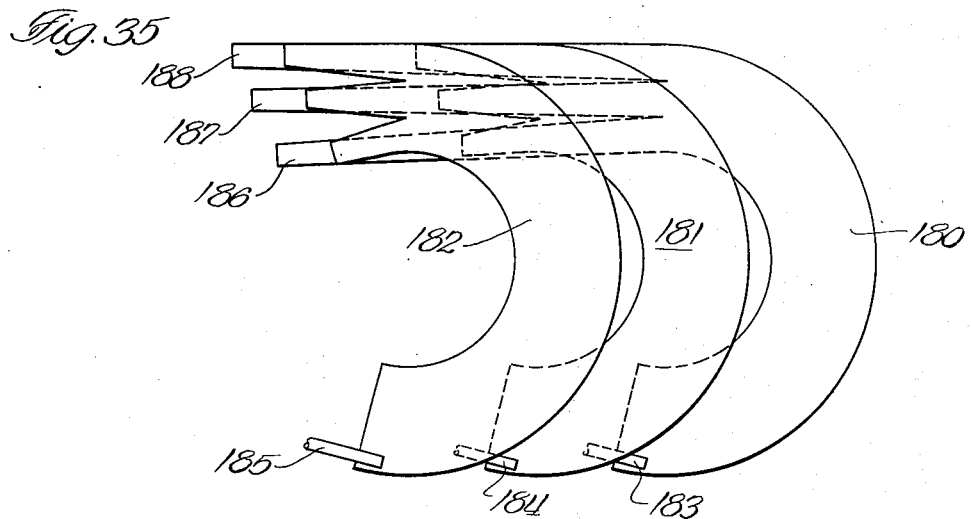
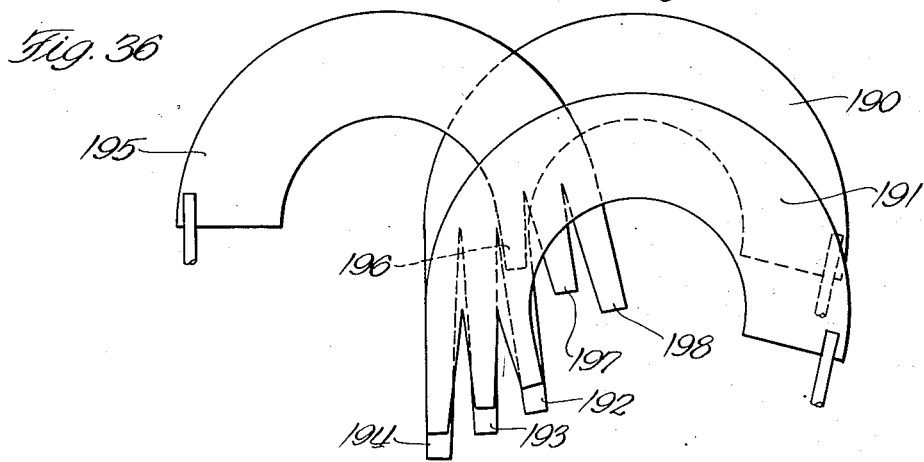
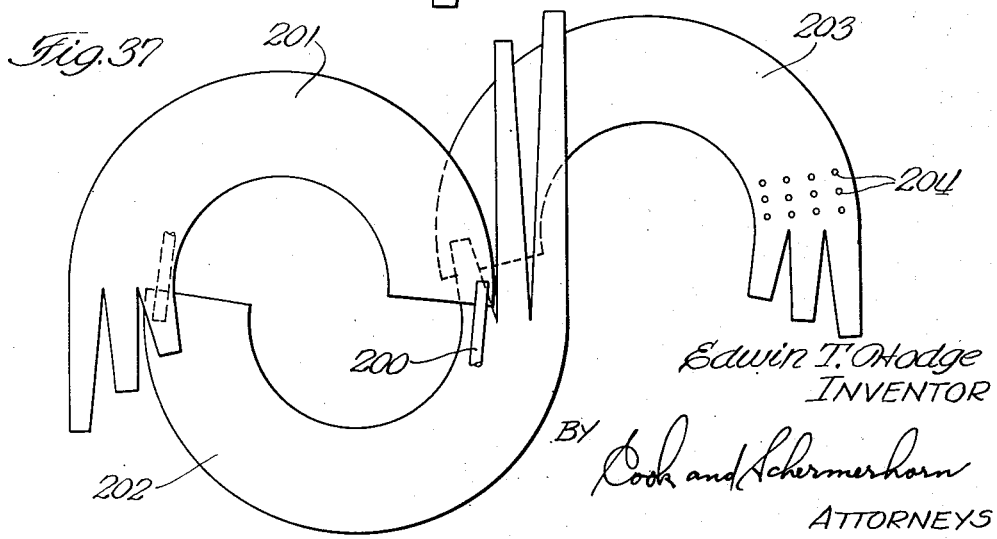
Edwin T. Hodge
INVENTOR
BY Cook and Schermerhorn
ATTORNEYS Patented Oct. 28, 1952

2,615,572

UNITED STATES PATENT OFFICE 2,615,572

SPIRAL SEPARATOR

Edwin T. Hodge, Portland, Oreg.

Application August 26, 1946, Serial No. 692,954

7 Claims. (Cl. 209—211)

This invention relates to a spiral separator for separating materials flowing in a stream subject to the influences of gravity, centrifugal force, and other forces.

More particularly, the present invention is concerned with the separation of materials having different responses to these influences, wherein the materials are carried in a fluid vehicle or wherein the materials themselves are caused to flow as a liquid. Thus, the materials to be separated may be mixtures of slimes or froths in liquids, different liquids, solids in liquids, or mixtures of dry solids. The invention also includes the use of a gas, such as air, as a fluid vehicle for carrying either solid or liquid particles for differential separation by the actions of gravity, centrifugal force and other forces. The invention further includes auxiliary treatment of one or more components of the materials as a part of the separation, and the control of different factors affecting the separation, such as the removal, addition or redistribution of the fluid vehicle in different stages of the separation, and the physical constants of the spiral channel.

When a stream of water carrying solid materials, for example, flows around any bend where it is confined by a channel its load is sorted out as to sizes and specific gravities, with the largest and heaviest materials moving to one side of the stream, and the finer and lighter materials distributed in zones from the bed of the stream upwardly, and from the inside of the curve outwardly, and with the water piling up on the outside of the bend. When the gravitational force is greater than the centrifugal force, the largest and heaviest materials move to the inside of the bend and the finer and lighter materials are carried by the stream to the outside of the bend. When the centrifugal force predominates over the gravitational force, this distribution is reversed. The primary contributing causes for this phenomenon are centrifugal force, gravity, bottom drag, intrastream friction, and deflection from the stream banks, all working together. For the purpose of separating materials still other forces and influences may be introduced. The same results obtain in a mixture of gases, a mixture of immiscible liquids, and in a mixture of solids behaving as a liquid.

Various devices to separate materials have heretofore been made involving one or more of the effects mentioned above, but all previously known devices and methods have definite limitations. Outstanding among these limitations are lack of capacity and lack of sensitivity or efficiency in separating components that are nearly alike. In existing devices the initial volume determines the capacity of the entire machine, and this capacity is necessarily limited because if the entrance volume is too great spillage will result, and if the channel gradient is increased to handle a larger volume the higher velocity in the channel will reduce the effect of gravity in relation to effect of centrifugal force to thereby lessen the differential separting action. The sensitivity of spiral channels in general is necessairily limited by the fixed value of gravitational force, a limited tangential velocity, a limited drag on a bottom of fixed slope, material and roughness, a limited intra-stream friction and a limited deflection from the fixed walls of the channel.

Previously known spiral separators have been of fixed diameters and pitches and have been limited to the performances of a single function, a separation in one step. To further work or separate the material it has heretofore been necessary to collect the material and transport it elsewhere to some other machine. It has been the previous practice to discharge concentrates in such manners as to prevent the working of two or more spirals in a continuous process wherein the material is kept constantly moving in a steady flow. Also, none of the previously known spirals can be enclosed so that gases could be used as a conveying and working medium.

The general object of the present invention is, therefore, to provide an improved method and machine which will overcome all the above limitations and objections, and which will include other helpful treatments in addition to the operations heretofore performed by known prior art separators.

Another object is to provide a novel spiral separator having almost limitless selectivity and sensitivity for handling large volumes of material with relatively small power requirements, wherein gravity does most of the work on the material.

Another important object is to provide a spiral separator in which all the material is kept moving at a substantially uniform velocity, and is discharged after separation at the end of the spiral at the same velocity so as to be immediately available and already in motion for introduction to other spirals or treatments.

Another object is to provide a spiral separator constructed and arranged so that the separated components can be carried to new channels for operations located at convenient places, and so that the fluid vehicle may be separated and available for re-use, if desired.

Another object is to provide a spiral separator wherein each of the separates is taken from the spiral at a point where the maximum efficiency attainable in time or by method has been achieved consistent with the law of diminishing returns, and wherein each separate is immediately transferred to a new stage suited more specifically to its treatment.

Another object is to provide a spiral separator having terminal dividers and individual outlets for delivering the separates without retarding the velocity established in the spiral.

Another object is to provide adjustments for the positions of the dividers and for the spiral diameters and pitches to suit the needs of different materials.

Another object is to provide means in a spiral separator for altering the velocities, for altering the conveying medium by physical or chemical additions or subtractions, and for subjecting the materials in the channels to physical or chemical influences in addition to gravity and centrifugal force.

Another object is to provide a separator of the type described having a plurality of spiral channels separated from each other while at the same time maintaining a continuous steady flow from one spiral to the next.

Another object is to provide a system of interconnected spiral channels to produce a continuous flow operation of classification and separation of materials, and at the same time produce other chemical and physical effects upon the materials.

Another object is to provide a system in which a plurality of spiral channels are nested to multiply the work accomplished by one channel and increase the amount of the separational product to fill to the full capacity a subsequent unit or phase in the separation.

Another object is to provide a system of spiral channels wherein each channel acts as an independent unit having the form, materials and attachments precisely suited to its needs, rather than to the average of the needs of the entire machine.

Another object is to provide a spiral separator having enclosed, tubular channels for carrying either gases or liquids at relatively high velocities in the separation process.

Another object is to provide a separator which is readily adapted for the application of various auxiliary devices for handling or treating the material in different phases and stages of the separation.

Another object is to provide a spiral channel which will separate non-miscible liquids and solids in a hot or cold state.

Another object is to provide a spiral channel to separate materials while they are being subjected to physical and chemical effects or are mixed with gases, liquids, reagents and solids such as flotation agents, sink and float media, etc.

Another object is to provide a spiral channel in which the velocity of flow and the direction of traverse can be varied.

Another object is to provide a spiral channel with supporting tubes which may be used to support accessory workers and which also serve as conduits to and from the channel for gases, liquids and solids.

Another object is to provide a spiral channel with screens in its walls through which are added or subtracted liquids or gases.

Another object is to provide screens in the walls of a spiral channel to produce mechanical or chemical effects on material passing over the screens.

Another object is to provide screens in the walls of a spiral channel with means to sweep the surfaces of the screens free of residues thereon.

Another object is to provide a spiral channel with terminal inlets and outlets disposed so that the walls of the channel may be used to support auxiliary workers.

The following terms are defined in order that they may be read with definite meanings in the accompanying specification and claims:

Channel: A walled-in enclosure having a semicircular or full circular cross section, or a combination of semicircular sections of varying radii, and curved lengthwise in a descending spiral.

Flare: The funnel-like outward spreading of the outlet of the channel.

Current liquid, or fluid vehicle: A gas or liquid which serves to carry a gaseous, liquid, or solid material, or a mixture of solids behaving as a liquid.

Components: Those constituents carried by the current liquid or fluid vehicle.

Concentrate: The component that is to be separated out in the pure state.

Middling: An intermediate component that contains some concentrate and some waste material or tailings.

Tailing: The waste material.

Slime: A mixture of fine solids or gases in liquids.

Foam: A mixture of a gas or gases and a liquid.

The invention resides in the steps of the method, in the combination of parts, and in the details of construction hereinafter set forth in the following specification and appended claims, certain embodiments of the apparatus being illustrated in the accompanying drawings in which:

Figure 1 is a side elevation view of a single channel spiral separator embodying the principles of the present invention in an adjustable apparatus for experimentally determining the best channel constants for specific materials;

Figure 2 is a cross sectional view of the channel, taken on the line 2—2 of Figure 1, showing an auxiliary vibrator device;

Figure 3 is a cross sectional view of the channel, taken on the line 3—3 of Figure 1, showing an auxiliary magnetic drag;

Figure 4 is a sectional view, taken on the line 4—4 of Figure 3;

Figure 6 is a plan view of the lower end of the first spiral channel in Figure 5, showing the water diverting device;

Figure 7 is a cross sectional view through the first channel, taken on the line 7—7 of Figure 6;

Figure 8 is a sectional view taken on the line 8—8 of Figure 6;

Figure 9 is a sectional view taken on the line 9—9 of Figure 6;

Figure 10 is an enlarged sectional view of the magnetic roller separator shown in Figure 5;

Figure 11 is a plan view of the magnetic roller separator shown in Figure 10;

Figure 12 shows an arrangement of electrostatic devices associated with a spiral channel for deflecting materials which are responsive to electrostatic forces;

Figure 13 is an enlarged view of the electrothermal drying device shown in Figure 5;

Figure 14 is a cross sectional view taken on the line 14—14 of Figure 13;

Figure 15 is a plan view of the feed end of the belt conveyor shown in Figure 5, illustrating its position in relation to the outlet of the first spiral channel;

Figure 16 is a plan view of a spiral channel outlet showing the use of adjustable splitters;

Figure 17 is a longitudinal sectional view taken on the line 17—17 of Figure 16;

Figure 18 is a cross sectional view of the adjustable splitters, taken on the line 18—18 of Figure 16;

Figure 19 shows an arrangement for adding a reagent or fluid vehicle to a trough or channel from the top;

Figure 20 shows an arrangement for adding a reagent or fluid vehicle through the bottom of a trough or channel.

Figure 21 shows the use of a trough-shaped belt for carrying materials from one spiral to the next for further treatment;

Figures 22 to 25 show different forms of longitudinal flutes or riffles which may be employed in the channel bottom to assist in segregating and dividing materials therein;

Figure 26 is a plan view of the outlet end of a typical spiral channel having non-adjustable dividers for separating material into three components in separate outlets;

Figure 27 is a cross sectional view taken on the line 27—27 of Figure 26 showing the nature of the separation produced by the various forces acting on the flow of material in the spiral channel;

Figures 28 to 31 are cross sectional views taken on the respective section lines of the same number in Figure 26, showing the development of the dividers from the smooth bottom of the channel into the separate and distinct outlets for the different components;

Figure 32 is a side view of a closed, tubular spiral channel, showing the nature of spiral flows of different components therewithin;

Figure 33 is a plan view of the spiral tube shown in Figure 32;

Figure 34 is a cross sectional view through the tube, showing the spiral motion of material traveling therein;

Figure 35 shows an arrangement for nesting a plurality of spiral channels so that their flows will add together to increase the capacity of the machine;

Figure 36 shows a different nesting arrangement wherein certain components of the different channels are added together and other components are removed; and Figure 37 shows a series arrangement of spiral channels for successive treatments of a particular component of the material.

Figure 5:
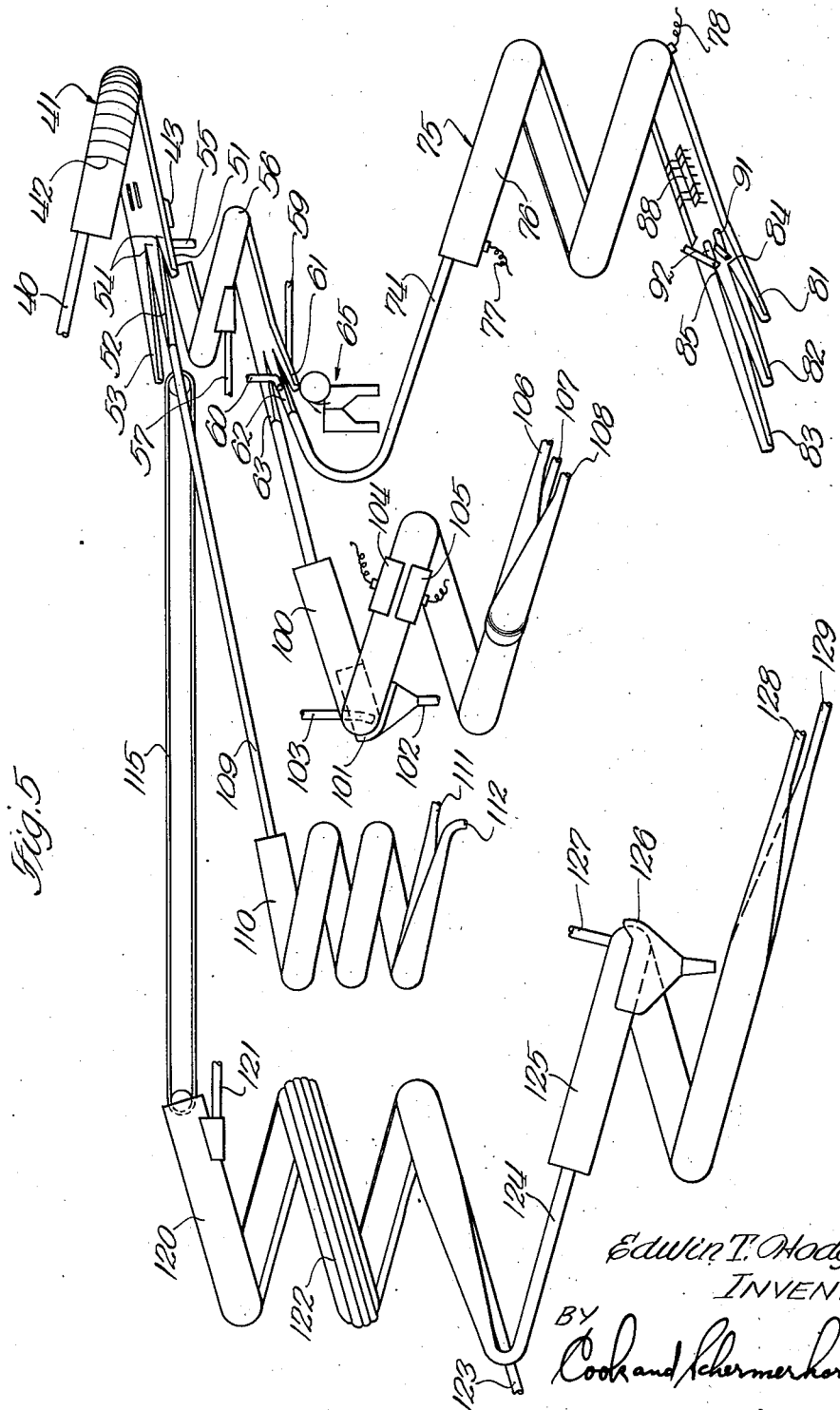
Figure 5 is a schematic view of a system employing a number of spiral separators of the general type shown in Figure 1, each being modified according to the need of the particular material handled thereby, the system being spread out and arranged so that all the channels will appear in the plane of the drawing.

In carrying out the principles of the present invention, the materials to be separated are carried at a uniform rate of flow throughout the length of a spiral channel without spillage over the sides of the channel on the way down. In the course of this flow centrifugal force, gravity, bottom drag, intrastream friction, and other forces all work together to cause the concentrates to move to one side of the channel with the tailings and slimes on the other side of the channel and the middlings in between. The relative positions sought by these components depend upon the relative effects of the forces upon the various materials in a particular system whereby it is possible to vary the separating action by changing the radius and gradient of the spiral by altering the roughness of the bottom of the channel, and by varying the other active forces. Where the materials are washed down with a large amount of water the finer and more buoyant materials are carried by the water and are little affected by bottom roughness, while coarser and heavier materials may be considerably retarded by bottom roughness causing them to seek a different path than if the bottom were smooth. Other forces such as electromagnetic forces and electrostatic forces may also be brought to bear on the materials to cause them to move to one side or the other as they flow down the channel. The effects of such forces may cause the materials to spread out over a considerable width of the channel bottom so that the materials on one side have insufficient water to carry them along while the materials on the other side are carried in a great excess of water. Means are accordingly provided for adding water where needed to maintain the desired flow and for removing water where it is in excess of the amount required. Such means may merely operate to redistribute the water in the channel or it may remove water from the system and add other water or other liquids for treating the material. Various kinds of transverse and longitudinal riffles may be used in the channel bottom and vibrators may be associated with the channel bottom to loosen and agitate the material so that individual particles will be free to respond to the various forces imposed thereon. Still other treating means may be associated with the channel depending upon the nature of the materials and the fluid vehicle. Where the materials are caused to flow in a dry state or where they are blown through an enclosed tubular spiral the temperature and humidity may be controlled in the channel and materials may be subjected to the action of different gases during their travel through the channel.

In all such variations of the device it is a fundamental principle of the invention that all the materials are carried through to the end of the channel where they are separated by dividers or splitters into smaller channels or troughs without immediately altering the direction or velocity of flow. The regimen of steady flow established at the beginning of the channel is maintained throughout the course of the channel and also as the flow passes the dividers or splitters and enters the terminal troughs. The output of each trough may be fed into a special treating device or into another spiral separator especially suited to the requirements of the particular material. A system of such spiral channels, each suited to the needs of a particular class of material, may be arranged to expedite the handling of all the material in continuous flow without special handling or storage equipment between stages. The number of steps and functions which can be accomplished in this manner are practically unlimited as different components of the material may be dried, watered, heated, cooled, magnetized, electrically charged, dissolved, precipitated, amalgamated, emulsified, evaporated, vibrated, agglomerated, flocculated, exploded, sublimed, chemically reacted, radiated, mixed with additives, mixed with flotation reagents, mixed with float and sink media, or otherwise treated in the course of the process.

Figure 1 shows a single spiral channel having various adjustments to alter the gradient and radius of the spiral and having adjustable auxiliary devices to vary the distribution of the materials in the channel and including adjustable splitters at the end of the channel for dividing these materials prior to their discharge from the channel. By means of such an arrangement variations and adjustments may be made while the device is operating to achieve the optimum conditions for separating particular classes of materials. The arrangement shown in Figure 1 is, therefore, in the nature of a laboratory apparatus which may be used to determine experimentally the optimum conditions for handling the whole bulk of material to be separated in the first stage, as well as the conditions for subsequently handling each of the components obtained from the first and subsequent separations for designing the various channels in a continuous flow multi-stage system of the type described.

The numeral 10 designates a channel of flexible material which may be curved into spiral form as shown. To prevent material from wasting over the sides of the channel its inner edge is provided with a curb 11 and its outer edge with a splash guard 12, which parts provide convenient means for attachment to supporting rods 13 carried by brackets 14 on a vertical standard 15. By means of clamp screws 16 the brackets 14 may be raised and lowered on the standard and the rods 13 may be extended or retracted in the clamps and turned on the standard to adjust the bank and grade of the channel and the radius of the spiral curve. Additional supports may be employed if desired at other points along the length of the channel. The numeral 17 designates transverse riffles in the bottom of the channel to overturn and loosen up the material prior to its descent.

Material is fed into the upper entrance end 18 of the channel through a pipe 5 at a velocity which may be equal to, less than, or greater than the velocity of gravity flow in this part of the channel. The channel may turn through an angle varying from 180° of arc to several turns, it being observed that the present spiral makes a complete turn of approximately 360° between its entrance end 18 and its outlet end 19. However, it is to be understood that the diameter and pitch of any one particular spiral may be either fixed or variable. In its spiral descent, the material introduced by the pipe 5 becomes distributed to a considerable extent across the width of the channel by the differential actions of the forces of gravity, centrifugal force, bottom friction, etc. as hereinabove described so that when the shape of the spiral is such as to cause the gravitational force to predominate over the centrifugal force, the concentrates will ride the inside of the turn with the tailings and most of the liquid on the outside and the middlings in between. Adjustable splitters 20 are provided at the outlet end to separate the material into three components so that most, or all, of the concentrates will flow into the trough 21 with the tailings flowing in the trough 23 and the middlings going into the trough 22. This separation may be quite distinct and complete in the case of components having widely different particle sizes and densities, but in the case of components which are more nearly similar in density and particle size further treatment is usually necessary to obtain the desired degree of purity in any of the components, and for this purpose other spiral channels may be arranged to receive the material discharged from the troughs 21 to 23 without changing the direction or velocity of flow. If a satisfactory separation of the three components has been obtained in the channel 10, the desired material or materials may, of course, be collected immediately at the outlet of the troughs.

The adjustable splitters 20 are mounted on vertical pivots at 24 forming fixed division points between the three troughs where the latter merge into the flare of the channel 10. The details of this construction may take the form shown in Figures 16, 17 and 18. By moving the adjustable splitters according to the pattern of material flow under a given set of conditions the division of material between the three troughs may be varied as to amount and kind. Once the proper positions of the splitters have been found for a given material and conditions in the arrangement shown in Figure 1, they may be replaced by fixed ridges and dividers in the bottom of the channel in a production machine made according to the final adjustments on the experimental machine. However, it may be desirable to retain the adjustable splitters in the production machine to allow for variations in the material and feed rate which may occur from time to time.

The flow of the material in the channel 10 may be modified by various agencies. The numeral 25 designates a pipe for adding water or other materials at an intermediate point in the spiral. The numeral 26 designates a magnetic vibrator and the numeral 27 designates a magnetic drag. Where the channel 10 is made of iron or other magnetic material, the vibrator may take the form shown in Figure 2, wherein an E-shaped laminated iron core 28 is carried by a bracket 29 adjustably mounted on a standard 30 closely adjacent the bottom of the channel. The base of the core 28 carries an energizing winding 31 which may be connected with an alternating current source, and the central leg of the core carries a shading coil 32. In this way the magnetic flux in the central leg is out of phase with the flux in the end legs of the core to produce a large amplitude of vibration in the channel. If the channel requires support in that portion acted upon by the vibrator a spring element 33 may be interposed between the channel and a supporting rod 13a as shown. However, any suitable type of vibrator including a sonic vibrator may be used, and if the channel is made of non-magnetic material it may have a piece of iron attached thereto to serve as an armature for the core 28 or it may receive mechanical impulses through a connecting link from an armature actuated by the core. Also, the vibrator device may be attached directly to the channel.

Figures 3 and 4 illustrate one form of magnetic drag having an arcuate laminated core 35 which is of U-shape in cross section to accommodate an energizing winding 36. This drag may comprise a permanent magnet but there are advantages in alternating current energization, because the periodic arresting action assists in facilitating the overturning of the material and the freeing of embedded non-magnetic materials, and speeds up periodic downstream movements. The action of the drag retards magnetic material in the channel and allows gravity a longer time to act on such material to pull it toward the inside of the channel away from the flow of non-magnetic material. If desired, the channel may be made of non-magnetic material in the vicinity of the drag, or throughout its length, so that the magnetic field of the drag will penetrate through the channel and include the layer of material flowing therein. Core 35 is carried by a bracket arm 37 adjustably mounted on a standard 38 so as to closely underlie the bottom of the channel. The drag may be extended in length or a plurality of drags may be employed to act on the material over a considerable length of the channel. By thus slowing up the magnetic material so that centrifugal forces are substantially eliminated, such materials, regardless of their size, may be effectively removed from other materials of the same particle size and density which are subject to the full effects of centrifugal force. Such magnetic materials are discharged from the inside trough 21 while the non-magnetic materials are discharged through the troughs 22 and 23.

The pipe 39 provides for adding water to the concentrate about to enter trough 21 to supply sufficient fluid vehicle for its movement in cases where this component becomes substantially dewatered by centrifugal action. This water goes immediately into trough 21 without disturbing the distribution of materials which has already taken place in the channel 10. The pipe 39 and other similar inlets may be used to add heat, chemical reagents, gases, liquids and solids, flotation reagents and float and sink media.

When it is desired to separate a mixture of many kinds of materials the apparatus shown in Figure 1 may be first set up and adjusted to separate the mixture into three components as a first stage in the process. In this first stage the trough 21 would yield so-called concentrates, the trough 22 would yield middlings, and the trough 23 would yield tailings and slimes, but each of these components may still contain materials which it is desirable to separate. Then the trough may be readjusted to handle each one of the three components as an input or feed to accomplish the desired further separation, and each such readjustment would form the basis for design of additional spiral channels which may be associated in a single continuous flow system for performing all the desired separations from one feeding operation without rehandling the material.

Such a system is shown in Figure 5 comprising a plurality of spiral separators, each operating upon the principles just described, but designed specifically to meet the requirements of a particular feed and placed in the system so as to receive only the material it is designed to handle. To illustrate the principles of the invention in its many ramifications and alternatives the system shown in Figure 5 is designed to handle a hypothetical mixture of minerals which are to be separated into the ultimate constituents. The adjustable channel shown in Figure 1 may first be used as laboratory apparatus for determining the physical constants to meet the different requirements of each of the spiral channels shown in Figure 5. In the latter figure the different units are spread out for clarity in the drawing, but it is to be understood that one of the advantages of the present system is that it permits the different stages of the process to be closely grouped to save space or separated even in different buildings to facilitate different kinds of treatment on different materials as an incidental or necessary part of the separation. Another advantage of the present spiral separator is that the components leaving the troughs 21, 22 and 23 may be divided quantitatively into unequal fractions each with a different amount of fluid vehicle and possibly even with different outlet velocities, as means may be provided for conveying the discharged material properly into the next channel. Either between stages or in the various stages additional fluid may be added to increase the velocity, heat and chemical reagents may be added, and de-watered material may be kept in such state if desired by transportation on flat or V-shaped endless belts which may be used merely to convey or also to add velocity to the material.

Figure 5, then, illustrates one of many possible combinations using the present type of channel. The system shown is particularly designed for the separation of minerals, but the operating principles can be utilized for separating numerous other materials, solid or liquid, dry or wet, and can comprise either a continuous succession of channels or a discontinuous series of channels having other operations interposed therebetween. The system of Figure 5 is specifically designed, for purposes of illustration, to handle a wet feed of chromite, zircon, hematite, magnetite, garnet, and amphibole, constituting the concentrates, quartz and orthoclase constituting the middlings, and muscovite and bentonite constituting the tailings, all fed by a pipe 40 into a first open channel 41. Assistance in the initial separation is given by transverse riffles 42.

Near the end of the channel 41 a portion of the water from the outer edge of the channel is diverted back to the unwatered concentrate by a water distributor 43, shown in detail in Figures 6 to 9. This water distributor comprises a housing 44 on the underside of the channel, establishing fluid communication between a plurality of elongated ports 45 on the high outer edge or tailings side of the channel, and a plurality of circular ports 46 on the low side or concentrates side of the channel. The effective length of the ports 45 is controlled by a sliding plate 47 which may be clamped in adjusted position by a nut or thumb screw 48. Beneath the circular ports 46 are a plurality of vanes 49 which may be turned by external knobs 50 to deflect the water upwardly through these ports to lift and assist in overturning the material to free middlings and tailings which have been carried along and segregated with the concentrates. It is to be understood that the ports 45 are placed high enough on the outside edge of the channel to be out of the path of solid material, so that none of the material carried by the water will enter these ports. The water, having performed its function in the channel 41 by the time it reaches the ports 45, is thereby redistributed to provide additional fluid vehicle for the substantially unwatered concentrates, so that their velocity may be maintained in their discharge from the channel and their entrance into the next channel. The concentrates, middlings and tailings are carried out of the channel 41 by the three troughs 51, 52 and 53, whose side walls join together and form the perpendicular dividers 54. The ports 46 are located just ahead of these dividers so that middlings and tailings freed from the concentrates by the additional water can move away from the concentrates trough, but so that most of the new water will be retained therein. If the water added to the concentrates by the distributor 43 is insufficient, additional water may be supplied through a pipe 55 entering through the bottom of the concentrates trough 51.

The concentrates from trough 51 are delivered to a second open spiral channel 56, where they are treated as new material to be again divided into concentrates, middlings and tailings. To free embedded middlings and tailings for separation in the second stage, liquid is introduced through the floor of channel 56 by means of pipe 57 to come in under the material to lift it and to overturn it and stir it up. The liquid introduced through pipe 57 also adds to the fluidity, and when this pipe is introduced in the direction shown in Figure 5 it adds to the velocity of the material in the channel, which, being the heaviest component from channel 41, has considerable bottom drag. It is evident that gases as well as liquids can be introduced. Likewise new material can be introduced through the distributor 43. The added gases and liquids can be utilized to give in addition to changes in velocity other chemical and physical effects.

In flowing down the spiral channel 56, the concentrates, middlings and tailings into which this material divides itself find their way into the respective outlet troughs 61, 62 and 63, the concentrates in trough 61 being hematite and magnetite. These concentrates are given additional velocity and fluidity by liquid introduced through the bottom of the trough 61 by means of pipe 59 for treatment by the magnetic separator 65.

Any conventional magnetic separator may be employed in this stage of the separation, but the present separator is provided with a roller 66 for receiving material from the trough 61, whereby the non-magnetic material is thrown into a bin 67 and the magnetic material is dropped into a bin 68 as shown in Figures 10 and 11. The action of this separator depends in part upon the velocity and fluidity of the material received, and this may be rather closely controlled by regulating the admission of water through pipe 59 in the manner described. Further control of the separating action may be effected by changing the speed of the roller and by an adjustable baffle 69, separating the stream of non-magnetic material 70 from the stream of magnetic material 71. In the present case, the non-magnetic material 70 would be hematite and the magnetic material 71 would be magnetite. The strength of the magnetic attraction exerted by the roll 66 may be adjusted to a value just sufficient to deflect the falling magnetite past the baffle 69 and into the bin 68 without any particular tendency to adhere to the roll, or a stronger magnetic field may be employed with a suitable commutator or other arrangement for limiting the attractive force to a small arc of rotation to avoid carrying material around with the roll. Also, a scraper edge 72 may be provided on the wall of the bin to remove magnetic material from the roll as the latter revolves. The numeral 73 designates a shaft upon which the roll 66 is mounted for rotation at controlled speeds.

The middlings in channel 56 comprise chromite and zircon, which find their way into outlet trough 62, where they are given additional velocity by a hot gas delivered through a pipe 60 to carry them through a duct 74 to an electrically heated open channel 75. Heat is supplied by a resistance heating element 76 having terminal connections 77 and 78 adapted to be energized from a variable voltage source to control the temperature. These materials delivered to the channel 75 from the second stage of separation of the concentrates of the original mixture are treated now as new material for further separation into components. The channel 75 preferably includes one or more complete turns to give sufficient length for drying the materials before they reach the outlet thereof. Outlet troughs for three components are designated by the respective numerals 81, 82 and 83, the intervening walls between these troughs merging to form dividers 84 and 85.

These dividers extend upstream in the trough 75 at gradually lessening height to form the longitudinal ridges 84a and 85a in Figure 12, where there is shown electrostatic means for effecting the final separation of the dried material. The nature of the specific electrostatic separating means may vary with the kind of materials being treated, the present means being shown merely for illustrating the principles of the invention. The channel may be given a positive charge by making it of metal and connecting it through a wire 86 with the positive side of a suitable source of E. M. F. The negative side of this source is connected through a wire 87 to a metal plate 88 carrying a row of pointed electrodes 89 forming a comb electrode on one side of the channel. The comb may be carried by insulating brackets 90 attached to the splash guard 75a, so that the points 89 are well down in the trough and relatively close to the stream of material moving therein just ahead of the beginnings of the dividing ridges 84a and 85a, where the material is free to move laterally in the trough. This electrode arrangement is intended to attract conductors to move them laterally across the channel so that they will enter the trough 83, leaving non-conductors to go into troughs 81 and 82. This action is further assisted by neon tube electrodes 91 and 92 carried on adjustable supporting arms 93 on a bridging member 94. These supporting arms may be moved to position their electrodes into optimum positions for capturing escaped conductors and causing them to move over the ridges 84a and 85a at a station in the channel where these ridges are relatively low. The action of this electrode system is such as to cause the deflection of a stream of good conductors, as indicated by the arrows 95, to one side of the channel for delivery through the trough 83. Meanwhile, the force of gravity moves non-conductors to the other side of the channel in a stream designated by the arrows 96, for delivery through the trough 81, materials of intermediate density or conductivity following an intermediate path, indicated by the arrows 97, between ridges 84a and 85a. Conductive material which is being carried along by non-conductive material will be captured by the electrodes 91 and 92 and moved over the ridges 84a and 85a away from the trough 81. Once over these ridges, the material will be retained in its new position by the increasing height of the ridges as they gradually rise to form the dividers 84 and 85. Thus, the zircon leaves by trough 83, the chromite by trough 82, and other material, constituting in this case the tailings, through trough 81. These so-called tailings may be returned to an appropriate part of the system for further treatment. The electrostatic, electrothermal, radiant, magnetic and any other type of auxiliary workers may be placed above, within, or outside the channel.

The tailings delivered from the trough 63 in the outlet of channel 56 comprise garnet and amphibole which are carried into the closed tube channel 100. In this stage the water is drained off through a screen 101 in the walls of the channel and into a duct 102. At the same time, hot gas from a pipe 103 sweeps the screen free of these minerals and dries them as the separation continues down through the course of the channel.

The adherent water is evaporated by a dielectric field established between conductor plates 104 and 105 arranged as shown in detail in Figures 13 and 14. These conductor plates may be relatively short, as shown, or they may extend for a considerable length along the channel. In this channel the garnet becomes concentrate, the amphibole the middlings, and any entrained material constitutes tailings which may be returned to an appropriate part of the system for further treatment. The gas pressure developed by evaporation of the water in the dielectric field escapes through the outlet of this tube, imparting an increased velocity to the material which is discharged in three components through the three ports or troughs 106, 107 and 108. Under the impelling force of gravity and gas pressure, then, the materials develop vortical paths in the tube 100, which must first be ascertained for the proper positioning of the three outlet ports whose splitters may be carried up to the roof of the channel for the separation of the dry material.

In the first channel 41, quartz and feldspar constitute the middlings to which are added flotation reagents and all are carried from the central trough 52 by a duct 109 to an open channel 110, where the separation is carried out more effectively than by the usual flotation process. The channel 110 has two outlet troughs 111 and 112 separated by a divider for delivering the quartz and feldspar in clean condition.

The de-watered tailings from the channel 41 comprising muscovite and bentonite, are carried from trough 53 without further wetting on a conveyor belt 115 to channel 120, this arrangement being shown in enlarged plan view in Figure 15. The belt 115 may be utilized to accelerate or decelerate the flow of material, and for the addition of liquids or materials so that the original material on the belt will be delivered to the channel 120 at a desired velocity and in a desired condition. A pipe 121 introduces an electrolyte into the bottom of this channel with sufficient velocity to produce overturning effects on the material to stir up the material and render the particles free of each other before they encounter the longitudinal riffles 122. The riffles aid in separating the agglomerated bentonite on the lower side of the channel to become the concentrate discharged through duct 123. The channel 120 effects a two part separation wherein the tailings, comprising the muscovite component, are carried by a duct 124 to another closed channel 125, where they are de-watered by a screen 126 and subjected to the drying action of a hot gas introduced through a pipe 127. After this screening and drying the muscovite becomes the middlings and entrained quartz and feldspar the concentrate, for discharge through the respective outlets 128 and 129.

The system illustrated in Figure 5 serves to show how the present type of channels facilitates progressive, selective separation and how numerous auxiliary devices may be associated therewith for the treatment of the material. Many other modifications of the channel may be devised, and the nature and type of auxiliary devices which may be associated therewith is practically unlimited. The showing in Figure 5 is more or less schematic in that the different channels are not necessarily shown in their true relative positions either horizontally or vertically. For instance, the duct 109 and conveyor belt 115 have been greatly elongated in order to illustrate all parts of the system in the plane of the paper. However, if there is any reason for carrying out stages of the present process in different localities, as for instance in different buildings which may be either adjacent or remote, different parts of the apparatus may obviously be very widely separated according to the facilities of the plant. Conversely, it will be apparent that the whole system shown in Figure 5 may be very compactly arranged to occupy a minimum of space where this is desirable. Also, it will be appreciated that although most of the system operates by gravity flow, causing the material to progress to successive lower levels without disturbing the regimen of flow, the material may also be elevated to higher levels by means of belt or bucket conveyors, or by means of gas or liquid current in closed ducts. The vertical relationship of the various channels and stages assumes a greater importance where certain of the materials are to be fed back into the system, and the present system adapts itself readily to re-working or re-circulation through any phases of the process with a minimum of mechanical equipment. Thus, it will be appreciated that the present system is extremely flexible and versatile, both as regards the functions carried out and in the matter of the physical disposition of the various parts of the apparatus.

Figures 16 to 18 illustrate a form of adjustable splitters which may be employed on the channel 10 in Figure 1 and on any of the open channels in Figure 5. Using the reference characters of Figure 1, the numeral 10 designates an open spiral channel having a curb 11 and a splash guard 12. This channel terminates at its lower end in three troughs 21, 22 and 23, whose sides merge together to form the vertical dividers 24 positioned to divide the channel flow into three parts to separate the concentrates, middlings and tailings. Associated with each of the dividers 24 is an upper bearing 135 and a lower opening 136 forming a lower bearing for rotatively supporting a post 137 carrying the adjustable splitter 20. By making the hole 136 considerably larger than the post 137, the latter has sufficient looseness to allow the splitter to be swung to different positions while maintaining a substantially tight engagement throughout its length with the curved bottom of the trough to prevent material from passing thereunder. This opening may be sealed by a washer 138 held in place by a nut 139 which also serves to clamp the splitter in adjusted position. When the materials in the channel have reached steady flow conditions, the upstream ends of the splitters may be moved to the most effective positions to divide the material into concentrates, middlings and tailings with the least amount of mixture. Then, if the nature of the flow conditions or material should change, the splitters may be readjusted from time to time without changing the other constants of the spiral. The three troughs 21 to 23 merge in smooth contours with the bottom of the channel so as to segregate the three components of material flowing therein with the least amount of interference and retardation to steady flow conditions, also referred to as the regimen of flow. It is, of course, understood that a channel may have only one, or three or more dividers if desired.

Figures 19 to 21 illustrate different ways of introducing liquids and gases. Either liquids or gases may be introduced as here shown merely for the purpose of adding to the fluid vehicle, or for its effect as a reagent, or to accelerate the velocity of the moving stream. In Figure 19, the trough 140 may be a trough similar to one of the troughs 21 to 23, or it may be an extension thereof constituting a conduit extending to some further separation or treatment. At 141 the trough merges into a closed tube, and aligned with the entrance to this tube is the open end of a pipe 142 for carrying material to be added to the stream. Such material may be added at a relatively high velocity to increase the flow in this part of the system for a particular purpose. This arrangement is similar to the disposition of the pipe 60 in the trough 62 in Figure 5.

In Figure 20, the trough 143 merges into the closed tube 144, and a pipe 145 enters the closed tube at a small angle so that a high velocity gas or liquid issuing from the pipe will serve to accelerate the flow of material in the tube. This arrangement is an extension of the idea of channel bottom introduction of additional fluid gas or reagent as accomplished by the pipes 59 and 121 in Figure 5.

In Figure 21 there is shown a trough-shaped belt 146 running over a similarly shaped pulley 147 for maintaining a flow of material to a distant point without losing altitude as would be required to maintain a gravity flow. Such a conveyor is particularly useful in handling de-watered material which would not readily flow by gravity, and might be used, for example, in place of the conveyor belt 115 in Figure 5. The numeral 148 indicates a trough opening into the belt trough 146 for adding solid or liquid materials. These belts, like the inlet ports, may be used to maintain, accelerate or decelerate the velocity of the material.

Figures 22 to 25 show different forms of longitudinal riffles which may be used in the spiral channels. These riffles may extend the length of the channel, or they may be confined to a particular section to assist in holding the materials in different flow paths after they have selected their relative positions on the channel bottom under conditions of steady flow. The channel bottom 150 has narrow, raised cusps separating a plurality of arcuate sub-channels, and the channel 151 is reversed to present wide dividing ridges between narrow sub-channels. The channel 152 has arcuate ridges and sub-channels of equal width. The channel 153 has riffles forming ridges of unequal slopes on the two sides whereby material will wash over more easily in one lateral direction than in the other. With, or in place of, the riffles, mats may be laid on the floor of the channel to affect drag, saltation, wear, transmission through the walls, etc.

Figures 26 to 31 illustrate the construction of a typical channel end having fixed dividers at the entrance to the troughs leaving the channel, Figures 27 to 31 showing cross sections of the channel and troughs at the different stations indicated in Figure 26. The spiral channel 155 has a curb 156 and a splash guard 157, and delivers its contents into the three troughs 158, 159, and 160 in proportions determined by the positions of the two dividers 161 and 162 in relation to the flow paths of the different materials in the channel. In an upstream direction, the dividers 161 and 162 form ridges 161a and 162a of decreasing height which finally merge into the smooth bottom of the trough, as shown. These ridges thereby cut up into the moving stratified material to slice it perpendicularly into two, three, or more ribbons as it approaches the divergent outlet troughs.

Under steady flow conditions the different materials tend to segregate or stratify themselves, as shown in Figure 27, showing concentrates 163, middlings 164, tailings 165, and liquid and slimes 166. The stratification or separation is illustrated somewhat diagrammatically, inasmuch as the cross sectional pattern varies with different materials and with different amounts of material in the channel. Where there are, for instance, only two different materials, and they are of widely different physical characteristics, the separation would be sufficiently distinct to be completed in a single stage in one channel, but where there is a greater amount of material of different kinds varying only slightly in physical characteristics, the separation would be much less distinct and could not be completed in the first channel. Thus, in Figure 27 it will be apparent that to obtain pure concentrates in the trough 158 the divider 161 would have to be positioned to divert most of the concentrates with the middlings. On the other hand, if it were desired to get all the concentrates in the trough 158, the divider 161 would have to be placed in a position where it would also include half the middlings and a substantial part of the tailings. However, by successive treatment in channels adapted to the requirements of the particular components, the purity of any or all of the components may be improved to the extent that the value justifies the additional apparatus. If, for instance, the concentrate were of a relatively high value, it would be desirable not to eliminate any of it in the first stage. The concentrate might then include a large part of the middlings and tailings, but by eliminating the slimes and a part of the middlings and tailings the concentrate could be introduced into a second channel which, by reason of the elimination of the lighter components, could operate more efficiently in separating what was left. After a succession of such separations in specially designed channels, no two of which are alike, the concentrate is obtained in a high state of purity. The only additional cost for such reworking of the material in the present system is the cost of the additional channels, as there are no reagents or power to be consumed in the treatment.

Figure 32 shows a tubular spiral channel through which material may be blown by gas of controlled temperature and humidity introduced through the port 171. The three outlet ports 172, 173 and 174 are mounted for longitudinal and rotative adjustment at the discharge end of the spiral tube 170, these ports being held in adjusted position by the clamp screw 175. In the interior of the tube the concentrates, middlings and tailings, or fines, tend to move in different vortical paths 176, 177 and 178, according to their different physical characteristics, whereby the outlet ports may be positioned with suitable dividers to separate these components. Electrostatic and magnetic fields may also be employed to deflect the paths of certain materials if desired. If the tube 170 is made of transparent material, the vortical paths may be observed therein to facilitate the adjustment of the outlet ports. Also, radiant effects may be transmitted through the transparent walls. In an end or cross sectional view, these paths appear as shown in Figure 34. This spiral tube is shown in plan view in Figure 33.

In addition to progressive selective separation, another advantage of the present invention is a great increase in capacity. No one fraction of a single channel limits the capacity of other portions of the system. Each fraction or component of the spiral accomplishes its work up to but not beyond the point where the law of diminishing returns sets in and there gives its products over to channels specifically suited to their needs. Thus, a plurality of the channels can be nested as shown in Figures 35 and 36 to multiply the work done by one channel without materially increasing the space required for the apparatus. In this way the amount of a separational product can be increased to feed to the full capacity of the next unit in the separation, or, as products are finished off, the number of channels may be decreased to correspond to the shrinking volume of material. This is in contrast with the large part of the capacity of the conventional separator which is not used. In the present system, each channel acts as an independent unit and can have the form, materials and attachments precisely suited to its needs, rather than the average needs of the entire machine. The series and parallel arrangements of channels shown in Figures 35 to 37 are not intended to comprise a complete separator, it being understood that additional channels may be placed ahead of, or after, the channels shown.

In Figure 35 the three channels 180, 181 and 182, having the respective feeds 183, 184, and 185, are nested one above the other so as to occupy substantially the same floor space as a single channel. The three troughs 186, 187 and 188, leading from the outlet of the bottom channel 180 and carrying its concentrates, middlings and tailings, are elongated as shown to receive the concentrates, middlings and tailings, respectively, from each of the other troughs also. If the material is approximately equally divided into these three components, each of the troughs 186, 187 and 188 will then ultimately carry about the same bulk of material originally introduced by each one of the feeds. Each one of these troughs may then feed into a channel having the same capacity as one of the present channels, and that capacity will be thereby fully utilized in each step of the process.

Figure 36 shows a different nesting arrangement. Here the lower and upper channels 190 and 191 add their concentrates, middlings and tailings in the three troughs 192, 193 and 194, as in Figure 35, but the intermediate channel 195 adds only its concentrates from its trough 196 to this output. The other two troughs 197 and 198 carry the middlings and tailings separately from the middlings and tailings troughs 193 and 194. This arrangement of channel 195 may be used to rework a rich middling or tailing from a channel located farther down the series.

Figure 37 shows an arrangement for nesting three channels for progressive separation of the concentrate of the concentrate in three stages. Here the feed 200 supplies the top channel 201 which delivers only its concentrate to the second channel 202. The concentrate from the channel 202 is fed into the third channel 203, while the middlings and tailings are carried out above this last channel. Near the outlet of the last channel, bottom ports 204 are provided to add water or chemicals and to overturn and stir up the material just prior to its discharge.

The number of channel combinations is practically unlimited, and many more useful arrangements and combinations can be devised by persons skilled in the art to fulfill the needs of any particular installation, the arrangements shown in Figures 35 to 37 being presented merely to illustrate a few examples of such combinations, and not to limit the scope of the invention. All changes in the construction and arrangement of parts, including other combinations and nesting arrangements of both open channels and tubular channels within the scope of the appended claims, are included in the invention.

Having now described my invention and in what manner the same may be used, what I claim as new and desire to protect by Letters Patent is:

1. The method of separating materials comprising flowing a source mixture in a spiral channel suited to said mixture subject to the influences of gravity and centrifugal force to distribute said materials in the channel in accordance with their responses to said influences and establish a regimen of steady flow, dividing said flowing materials according to the positions of their flow paths in the channel into separate parallel flowing components without disturbing the regimen of flow, leading off said separate components in individual tangential channels while maintaining the regimen of flow of each component, directing at least one of said components into a second spiral channel specifically suited to the type and quantity of material of that particular component while maintaining the regimen of flow during transfer to the second spiral channel, and dividing the flow in the second spiral channel into sub-components.

2. The method of separating materials comprising flowing said materials in a spiral channel subject to the influences of gravity and centrifugal force to distribute said materials into different flow paths in the channel in accordance with their responses to said influences and establish a regimen of steady flow, gently introducing a fluid agent through the bottom of the channel into one of said flow paths to uplift solid material without disturbing the regimen of flow, dividing said flowing materials according to their positions in the channel into separate parallel flowing components without disturbing the regimen of flow, and leading off said components in separate channels without disturbing the regimen of flow, for a further spiral channel separation of at least one of said components into sub-components.

3. The method of separating materials comprising flowing said materials in a liquid current in a spiral channel subject to the influences of gravity and centrifugal force to distribute said materials in the channel into different flow paths in accordance with their responses to said influences so as to cause the concentrates to tend to flow on one side of said channel and the liquids and tailings to flow on the other side of the channel in a regimen of steady flow, removing a portion of said liquid through the bed of the channel on the tailings side of the channel and introducing said removed liquid gently into the flow of concentrates through the bed of the channel on the concentrates side of the channel without disturbing the regimen of flow, gradually dividing said flowing materials into separate components such as concentrates, middlings and tailings according to the positions of their respective flow paths in the channel without disturbing the regimen of flow, and leading off the flow of each component in a separate sub-channel without disturbing the regimen of flow for the further spiral channel separation of at least one of said components into sub-components.

4. A gravity flow separator comprising a spiral channel having a transversely curved bottom, a plurality of troughs in side by side relation extending tangentially from the lower end of said channel, contiguous troughs having proximal side walls merging together to form dividers in said channel of gradually diminishing height and width in an upstream direction to separate gradually different parallel flow paths in said channel and convey flowing material into said troughs without disturbing the regimen of flow.

5. A separator comprising a spiral channel having a transversely curved bottom at uniform grade to establish a regimen of flow of materials in the channel, a plurality of troughs in side by side relation extending tangentially from the lower end of said channel at different elevations in accordance with the transverse tilt of the channel end, contiguous troughs having proximal side walls merging together and extending in an upstream direction in the bottom of said channel in gradually diminishing height to form dividers in said channel for gradually dividing a flow of material in said channel into said troughs without disturbing said regimen of flow.

6. A separator comprising a spiral channel having a transversely curved bottom for flowing materials subject to the influence of gravity and centrifugal force to establish a flow path for concentrates on one side of the channel and a flow path for excess liquid on the other side of the channel in a regimen of steady flow, said channel bottom being perforate in a region on said concentrates side of the channel, and means for introducing a fluid agent gently through said perforate region of the bottom without disturbing the regimen of flow.

7. A separator comprising a spiral channel having a transversely curved bottom for flowing materials in a liquid current subject to the influences of gravity and centrifugal force to establish a flow path for concentrates on one side of the channel and a flow path for excess liquid on the opposite side of the channel, said channel bottom having a perforate section on its liquid side to remove a portion of said liquid through the bed of the channel with minimum disturbance to the regimen of flow, said channel bottom having a perforate section on its concentrates side to introduce liquid through the bed of the channel with minimum disturbance to the regimen of flow, and a conduit receiving liquid from said first mentioned perforate section and delivering it to said last mentioned perforate section to redistribute the liquid in the channel.

EDWIN T. HODGE.

REFERENCES CITED

The following references are of record in the file of this patent:

UNITED STATES PATENTS

| Number | Name | Date |
|---|---|---|
| 629,595 | Pardee | July 25, 1899 |
| 694,420 | Rice | Mar. 4, 1902 |
| 840,354 | Lyle | Jan. 1, 1907 |
| 1,004,412 | Gilchrist | Sept. 26, 1911 |
| 1,023,750 | Morscher | Apr. 16, 1912 |
| 1,032,281 | Hawley | July 9, 1912 |
| 1,056,318 | Bruck | Mar. 18, 1913 |
| 1,322,487 | Falby | Nov. 18, 1918 |
| 1,659,153 | Pardee | Feb. 14, 1928 |
| 1,959,736 | Rademacher | May 22, 1934 |
| 2,101,572 | Broatch | Dec. 7, 1937 |
| 2,104,537 | Ellis | Jan. 4, 1938 |
| 2,267,496 | Ellis et al. | Dec. 23, 1941 |
| 2,328,577 | Oglesby | Sept. 7, 1943 |
| 2,431,559 | Humphreys | Nov. 25, 1947 |
| 2,431,560 | Humphreys | Nov. 25, 1947 |

FOREIGN PATENTS

| Number | Country | Date |
|---|---|---|
| 546,888 | France | Feb. 7, 1922 |

OTHER REFERENCES

Huff: "New Type Concentrator Cuts," Eng. and Min. Journal, Oct., 1943, vol. 144, No. 10; pages 68, 69, 70.

"Humphreys Spiral," Chem. and Met. Eng. April 1945; pp. 107, 108, 109.